United States Patent [19]

Tung et al.

[11] Patent Number: 4,910,290

[45] Date of Patent: Mar. 20, 1990

[54] HIGH STRENGTH COPOLYESTER

[75] Inventors: William C. T. Tung, Tallmadge; Merry E. Floyd, Akron, both of Ohio

[73] Assignee: The Goodyear Tire and Rubber Company, Akron, Ohio

[21] Appl. No.: 235,264

[22] Filed: Aug. 23, 1988

Related U.S. Application Data

[63] Continuation of Ser. No. 41,520, Apr. 23, 1987, abandoned.

[51] Int. Cl.⁴ ............................................. C08G 63/02
[52] U.S. Cl. .................................. 528/272; 528/291; 528/292; 528/296; 528/308.1; 528/308.6; 528/310; 528/331; 264/176.1
[58] Field of Search ............... 528/272, 291, 292, 296, 528/308.1, 308.6, 310, 331; 264/176.1

[56] References Cited

PUBLICATIONS

Chemical Abstracts 87:153553d—Asahi Chem.
Chemical Abstracts 83:81518p—BASF.
Chemical Abstracts 82:452816b—Dr. Beck.
Chemical Abstracts 80:96717g—Asahi Chem.
Chemical Abstracts 100:122432w—Toyobo Co., Ltd.
Chem. Abstracts 100:183286y—Toyobo Co., Ltd.
Chem. Abstracts 92:231440—Toyobo Co., Ltd.
Chem. Abstracts 90:187901t—Toyobo Co., Ltd.
Chem. Abstracts 89:7024g—Toyobo Co., Ltd.
Chem. Abstracts 83:149209w—BASF.

*Primary Examiner*—John Kight
*Assistant Examiner*—S. A. Acquah
*Attorney, Agent, or Firm*—Alvin T. Rockhill

[57] ABSTRACT

It has been determined that the mechanical and thermal properties of polyesters can be improved by incorporating hydroxyalkyl trimellitic imides therein. Such polyesters are comprised of repeat units which are derived from (a) at least one diacid component, (b) at least one diol component, and (c) at least one hydroxyalkyl trimellitic imide.

15 Claims, No Drawings

HIGH STRENGTH COPOLYESTER

This is a Continuation of application Ser. No. 041,520 filed on Apr. 23, 1987 now abandoned.

BACKGROUND OF THE INVENTION

Polyesters are utilized in many applications wherein it is important for them to have high strength and good thermal properties. For instance, polyesters are commonly utilized in making tire cords and molded articles wherein high tensile strength is required. Such tire cords are commonly made out of polyethylene terephthalate which has respectable tensile strength. However, it is highly desirable to modify the polyethylene terephthalate in a manner that increases its tensile strength. For example, U.S. Pat. No. 4,605,728 discloses that the mechanical and thermal properties of polyesters can be improved by incorporating bis-hydroxyalkyl pyromellitic diimides therein.

SUMMARY OF THE INVENTION

It has been discovered that hydroxyalkyl trimellitic imides can be utilized to modify polyesters in order to improve their strength and to increase their glass transition temperature ($T_g$). This modification is accomplished by copolymerizing the hydroxyalkyl trimellitic imide into the polyester as a monomeric repeat unit. In other words, the hydroxyalkyl trimellitic imide is polymerized into the polyester as an additional component along with the diacid component and the diol component.

The present invention more specifically relates to a polyester comprised of repeat units which are derived from (a) at least one diacid component, (b) at least one diol component, and (c) at least one hydroxyalkyl trimellitic imide. Generally, from about 2 weight percent to about 90 weight percent of the repeat units in such polyesters will be derived from hydroxyalkyl trimellitic imides.

The present invention also reveals a process for preparing a high strength copolyester which comprises copolymerizing (a) at least one diacid component, (b) at least one diol component, and (c) at least one hydroxyalkyl trimellitic imide. In most cases the diol component will be comprised of one or more members selected from the group consisting of glycols containing from 2 to 12 carbon atoms, glycol ethers containing from 4 to 12 carbon atoms, and polyether glycols having the structural formula:

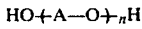

wherein A is an alkylene group containing from 2 to 6 carbon atoms and wherein n is an integer from 2 to 400.

DETAILED DESCRIPTION OF THE INVENTION

The polyester compositions of this invention are prepared by reacting a diacid component with a diol component. The diacid component can, of course, be a diester, such as dimethyl terephthalate. The term "diacid component" as used herein is therefore intended to include diesters. The term "diol component" as used herein is also deemed to include glycol ethers (diethers) and polyether glycols. These polyester compositions can be made in any conventional manner well known in the art. Thus, conventional temperatures, catalysts, amounts of catalysts, stabilizers, and the like, are utilized in manners well known in the literature and art.

The diacid component in the polyesters to which this invention pertains are normally alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, or diesters of alkyl substituted aryl dicarboxylic acids which contain from 11 to 22 carbon atoms. The preferred alkyl dicarboxylic acids will contain from 4 to 12 carbon atoms. Some representative examples of such alkyl dicarboxylic acids include glutaric acid, adipic acid, pimelic acid, and the like. the preferred diesters of alkyl dicarboxylic acids will contain from 6 to 12 carbon atoms. A representative example of such a diester of an alkyl dicarboxylic acid is azelaic acid. The preferred aryl dicarboxylic acids contain from 8 to 16 carbon atoms. Some representative examples of aryl dicarboxylic acids are terephthalic acid, isophthalic acid, and orthophthalic acid. The preferred diesters of aryl dicarboxylic acids contain from 10 to 18 carbon atoms. Some representative examples of diesters of aryl dicarboxylic acids include dimethyl terephthalate, dimethyl isophthalate, diethyl orthophthalate, dimethyl naphthalate, diethyl naphthalate and the like. The preferred alkyl substituted aryl dicarboxylic acids contain from 9 to 16 carbon atoms and the preferred diesters of alkyl substituted aryl dicarboxylic acids contain from 11 to 15 carbon atoms.

The diol component utilized in preparing the copolyesters of the present invention will normally be selected from the group consisting of glycols containing from 2 to 12 carbon atoms, glycol ethers containing from 4 to 12 carbon atoms, and polyether glycols having the structural formula:

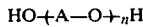

wherein A is an alkylene group containing from 2 to 6 carbon atoms and wherein n is an integer from 2 to 400. Generally, such polyether glycols will have a molecular weight of 400 to about 4000.

Preferred glycols normally contain from 2 to 8 carbon atoms with preferred glycol ethers containing from 4 to 8 carbon atoms. Some representative examples of glycols that can be utilized as the diol component include ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4-tetramethyl-1,3-cyclobutane diol, and the like. Some representative examples of polyether glycols that can be used include polytetramethylene glycol (Polymeg ®) and polyethylene glycol (Carbowax ®).

The hydroxyalkyl trimellitic imides utilized in preparing the copolyesters of the present invention generally have the structural formula:

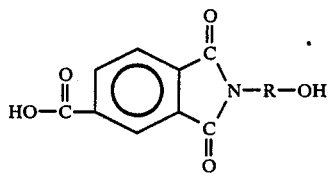

wherein R represents an alkylene group containing from 1 to 20 carbon atoms. The hydroxyalkyl groups in the hydroxyalkyl trimellitic imides normally utilized in the practice of the present invention will normally contain from 2 to 8 carbon atoms. In other words, the alkylene group will normally contain from 2 to 8 carbon atoms. In most cases, the hydroxyalkyl trimellitic imides will contain hydroxyalkyl groups that contain from 2 to 4 carbon atoms. Hydroxyethyl trimellitic imide is a good example of a hydroxyalkyl trimellitic imide that can be utilized in modifying polyesters in accordance with the present invention. Typically the modified polyesters of this invention will contain from about 5 to about 80 weight precent hydroxyalkyl trimellitic imides, based upon total repeat units in the polymer. In most cases such modified polyesters will contain from 10 to 60 weight percent hydroxyalkyl trimellitic imides.

The modified polyesters prepared in accordance with the present invention can also be branched. Such branching is normally attained by utilizing a branching agent in the polyesterification reaction utilized in the synthesis of the polyester. Such branching agents normally contain three or more functional groups and preferably contain three or four functional groups. The reactive groups may be carboxyl or aliphatic hydroxyl. The branching agent can contain both types of groups. Examples of aridic branching agents include trimesic acid, trimellitic acid, pyromellitic acid, butane tetracarboxylic acid, naphthalene tricarboxylic acids, cyclohexane-1,3,5-tricarboxylic acids, and the like. Some representative examples of hydroxyl branching agents (polyols) include glycerin, trimethylol propane, pentaerythritol, dipentaerythritol, 1,2,6-hexane triol, and 1,3,5-trimethylol benzene. Generally, from 0 to 3 percent of a polyol containing from 3 to 12 carbon atoms will be used as the branching agent (based upon the total diol component).

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

Hydroxyethyl trimellitic imide was prepared by charging one mole of trimellitic anhydride, 105 ml of ethylene glycol, and 45 ml of water into a three-neck round bottom flask which was equipped with a stirrer and subsequently adding one mole of ethanol amine in 40 ml of water to the flask. The mixture was refluxed at 110° C. for three hours under a nitrogen atmosphere. Upon cooling the mixture solidified and the solid was washed three times with water. The product was then dried in a forced air oven at 80° C. over night. A yield of about 65% was attained and the hydroxyethyl trimellitic imide produced had a melting point of about 196° C. The reaction that took place can be illustrated by the equation:

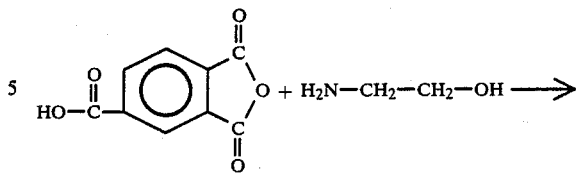

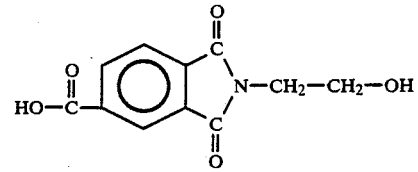

EXAMPLE 2

A polyethylene terephthalate oligomer was prepared by reacting terephthalic acid with ethylene glycol at a temperature of 280° C. and a pressure of 35 pounds per square inch ($2.41 \times 10_5$ Pascals). The polyethylene terephthalate oligomer (PET heel) prepared had an average degree of polymerization of about 5.

Forty grams of the PET heel, 10 grams of the hydroxyethyl trimellitic imide produced in Example 1, and 0.06 grams of antimony trioxide ($Sb_2O_3$) were charged into a glass polymerization reactor. The mixture in the reactor was heated to a temperature of 270° C. and stirred under a nitrogen atmosphere for 30 minutes. The pressure was then reduced to less than about 0.5 mm of mercury (66.6 Pascals) with the temperature being maintained at 270° C. and the polymerization was continued for 2 additional hours. The polymer produced was discharged from the reactor and was determined to have a glass transition temperature of 83° C.

A control experiment was also conducted wherein no hydroxyethyl trimellitic imide was utilized as a monomer in the polymerization. In other wards, unmodified polyethylene terephthalate was made in the control experiment. The polyethylene terephthalate made in the control experiment was determined to have a glass transition temperature of 74° C. This clearly shows that hydroxyalkyl trimellitic imides can be incorporated into polyesters in order to increase their glass transition temperature. In fact, the modified polyester made in this experiment which contained 20% hydroxyethyl trimellitic imide had a glass transition temperature that was 9° C. higher than the unmodified polyethylene terephthalate.

EXAMPLE 3

The procedure utilized in Example 2 was repeated in this experiment except that about 18 g of the hydroxyethyl trimellitic imide was added to the PET heel along with the antimony trioxide catalyst. Thus, the modified polyethylene terephthalate produced contained about 31% hydroxyethyl trimellitic imide (based upon total repeat units) and was determined to have a glass transition temperature of 93° C.

EXAMPLE 4

The procedure utilized in Example 2 was repeated in this experiment except that about 71 g of hydroxyethyl trimellitic imide was added to the polyethylene terephthalate oligomer in order to produce a polymer that contained 64 weight percent repeat units which were derived from the hydroxyethyl trimellitic imide. The polyester produced in this experiment has a glass transition temperature of 126° C.

EXAMPLE 5

In this experiment a polyester containing 80% hydroxyethyl trimellitic imide repeat units was made by utilizing the procedure specified in Example 2 with 160 g of the hydroxyethyl trimellitic imide being added to the PET heel. The modified polyethylene terephthalate produced had a glass transition temperature of 143° C.

In order to be utilized in high performance applications, polyethylene terephthalate can be modified by incorporating hydroxyalkyl trimellitic imides therein in order to raise its glass transition temperature and modulus. By incorporating hydroxyalkyl trimellitic imides into the backbone of such polyesters, their overall rigidity, bulkiness and melt viscosities are also greatly increased.

While certain representative embodiments have been shown for the purpose of illustrating the present invention, it will be apparent to those skilled in this art that various changes and modifications can be made therein without departing from the scope of the present invention.

What is claimed is:

1. A polyester comprised of repeats units which are derived from (a) at least one diacid component, (b) art least one diol component, and (c) at least one hydroxyalkyl trimellitic imide wherein the polyester is comprised of from about 5 to about 80 weight percent hydroxyalkyl trimellitic imides.

2. A polyester as specified in claim 1 wherein said diacid component is selected from the group consisting of alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, and diesters of alkyl substituted aryl dicarboxylic acids which contain from 11 to 22 carbon atoms; and wherein the diol component is selected from the group consisting of glycols containing from 2 to 12 carbons atoms, glycol ethers containing from 4 to 12 carbon atoms, and polyether glycols having the structural formula:

wherein a is an alkylene group containing from 2 to 6 carbon atoms and wherein n is an integer from 2 to 400.

3. A polyester as specified in claim 2 wherein said hydroxyalkyl trimellitic imides have the structural formula:

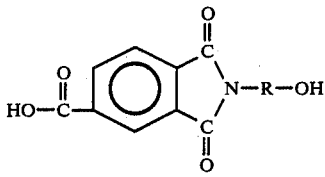

wherein R represents an alkylene group containing from 2 to 8 carbon atoms.

4. A polyester as specified in claim 3 wherein said diacid components are selected from the group consisting of alkyl dicarboxylic acids which contain from 4 to 12 carbon atoms, diesters of alkyl dicarboxylic acids which contain from 6 to 12 carbon atoms, aryl dicarboxylic acids which contain from 8 to 16 carbon atoms, and diesters of aryl dicarboxylic acids which contain from 10 to 15 carbons atoms.

5. A polyester as specified in claim 4 wherein said glycols contain from 2 to 8 carbon atoms; and wherein said glycol ethers contain from 4 to 8 carbon atoms.

6. A polyester as specified in claim 5 wherein the hydroxyalkyl group in said hydroxyalkyl trimellitic imide contains from 2 to 4 carbon atoms.

7. A polyester as specified in claim 6 wherein said diacid component is selected from the group consisting of aryl dicarboxylic acids containing from 8 to 16 carbon atoms and diesters of aryl dicarboxylic acids containing from 10 to 18 carbon atoms.

8. A polyester as specified in claim 7 wherein the hydroxyalkyl group in said hydroxyalkyl trimellitic imide contains from 2 to 4 carbon atoms.

9. A polyester as specified in claim 8 wherein said polyester contains from about 10 to 60 weight percent of hydroxyalkyl trimellitic imide.

10. A polyester as specified in claim 9 wherein said diacid component is terephthalic acid or a diester thereof.

11. A polyester as specified in claim 10 wherein said hydroxyalkyl trimellitic imide is hydroxyethyl trimellitic imide.

12. A polyester as specified in claim 11 wherein said member selected from the group consisting of glycols, glycol ethers, and polyether glycols is ethylene glycol.

13. A polyester as specified in claim 1 which is in the form of a tire cord.

14. A polyester as specified in claim 12 which is in the form of a tire cord.

15. A polyester as specified in claim 1 which is in the form of a molded article.

* * * * *